United States Patent [19]

Meacle

[11] Patent Number: 5,055,123
[45] Date of Patent: Oct. 8, 1991

[54] METHOD AND APPARATUS FOR EQUALIZATION OF TEMPERATURE IN A FOREHEARTH IN GLASS MANUFACTURE

[75] Inventor: Thomas Meacle, Dun Laoghaire, Ireland

[73] Assignee: Ardagh Glass Limited, Dublin, Ireland

[21] Appl. No.: 538,388

[22] Filed: Jun. 14, 1990

[30] Foreign Application Priority Data

Jun. 16, 1989 [IE] Ireland ................................. 1955/89

[51] Int. Cl.$^5$ .............................................. C03B 5/23
[52] U.S. Cl. ....................................... 65/137; 65/346; 65/356; 65/136
[58] Field of Search .................. 65/136, 137, 135, 346, 65/356

[56] References Cited

U.S. PATENT DOCUMENTS

| | | |
|---|---|---|
| 2,767,518 | 10/1956 | Schmid . |
| 3,582,310 | 6/1971 | Avery et al. ........................... 65/346 |
| 4,622,059 | 11/1986 | Brown ............................... 65/346 X |
| 4,680,051 | 7/1987 | Blumenfeld et al. .................. 65/346 |

OTHER PUBLICATIONS

Blumenfeld & Bubon, Forehearth Technology, Glass, Apr. 1985, pp. 121, 123 and "Appendix 3".

*Primary Examiner*—Robert L. Lindsay
*Attorney, Agent, or Firm*—Gallagher, Thomas A.

[57] ABSTRACT

The invention provides a method and apparatus for equalizing the temperature of molten glass (2) over the cross-section of a stream thereof advancing through a refractory forehearth from a glass furnace to a glass working machine. To this end, cooling air is blown downwardly to strike the mid-line of the stream, and is then evacuated upwardly from locations on either side of the mid-line, in such manner that substantial side regions of the stream surface are preserved from cooling contact with the cooling air. Apparatus for this purpose comprises refractory blocks (4a, 4b) which can be assembled to form a forehearth superstructure or roof, the blocks having hollow formations which unite on assembly thereof to form feed (11) and return (12, 13) channels for the cooling air, as well as inlet (8) and exhaust (9, 10) ducts for directing it at the molten glass and recovering it thereafter.

10 Claims, 3 Drawing Sheets

METHOD AND APPARATUS FOR EQUALIZATION OF TEMPERATURE IN A FOREHEARTH IN GLASS MANUFACTURE

This invention relates generally to a method and apparatus for equalizing the temperature over the cross-section of a parallel-sided stream of molten glass having a free surface and advancing along a tunnel. It relates in particular to a method and apparatus for equalizing the temperature, and hence the viscosity, of molten glass in a forehearth of the type commonly used for conveying molten glass from a melting furnace to a glass working machine, especially in the glass vessel manufacturing industry, such a forehearth being referred to hereinafter as a fore-hearth of the type described.

The chief purpose of a forehearth of the type described is to equalize the temperature of an advancing stream of molten glass over the cross-section thereof so that the glass on exit, where it is extruded from a feeder bowl and cut into standarised gobs (or mould charges) which are then fed to a glassware forming machine, shall be of a substantially unvarying temperature, and thus of constant viscosity, for the duration of a moulding run; each gob of glass in consequence shall have a substantially uniform temperature in all of its parts.

A forehearth of the type described often comprises a plurality of zones in series, usually including at least one cooling zone, and terminates, at the entrance to the moulding machine, in an equalizing zone which has heating only. There are many known variations on this basic layout, in forehearths of the type described.

In an earlier state of the art than prevails today, foreheaths of the type described advanced the molten glass along a tunnel of refractory material in a slow-moving stream wherein the glass in the outer or edge regions, adjoining the refractory material, tended to lose heat faster and to cool more quickly than the glass in the central regions. For this reason, heating means such as gas or oil burners, or submersible electrodes, have been provided for heating the glass at the sides of the forehearth.

Modern multi-mould glass working machines, such as glass vessel moulding machines, typically consume molten glass at a much greater rate than their predecessors of the 1940's and 1950's did. Such high rates of consumption (high pulls) mean a faster flow of molten glass though the forehearth, so that, irrespective of the means adopted or the method used for equalizing temperature throughout the glass stream, any given cross-section of the stream is exposed to said means or subjected to said method for a much shorter time than used to be the case.

One way of compensating for these developments would be to employ a substantially longer forehearth, in which accordingly the dwell time of the glass would be greater, and the older (and, it must be said, less efficient) methods and means for equalizing temperature would have more time to operate, and thus a greater chance of being effective. The length needed would be up to twice what was common in earlier practice.

Unfortunately the design of furnaces and glass working machines and, in particular, the dimensions and layout of existing glass factories make it prohibitively expensive to lengthen the forehearths. The problem thus presents itself of equalizing the temperature over the cross-section of a relatively fast-flowing stream of molten glass in a forehearth of merely conventional length.

It is known to provide a current of cooling air, blown into the forehearth either in the direction of glass flow or transversely thereof, in an effort to cool the mid-region of the stream. Such air currents tend, however, to reduce the efficiency of the burners. They are also difficult to confine to the mid-region of the glass stream; this feature leads to cooling in undesired places, and increased costs.

Thus U.S. Pat. No. 2,767,518 discloses a forehearth wherein a blast of cold air is supplied through refractory tubes 15 (FIG. 2) to the center of the glass channel above the surface of the glass. The cooling air from said tubes 15, however, passes out of the heating chamber 17 through the flues 12 together with the products of combustion from the burners, so that the cooling effect is not confined to the midstream glass and in fact, directly opposes the heating effect of the burners.

It is also known, and described in U.S. Pat. No. 3,999,972, to provide a forehearth having a roof with two longitudinal ridges extending downwardly therefrom, so as to define a channel over the central portion of the stream of molten glass, and a respective side channel, on either side of said central channel, over a respective side portion of the stream, and to provide means for feeding a cooling gas along the central channel in contact with the upper surface of the glass, between inlet and outlet apertures in the roof, longitudinally spaced apart, while simultaneously providing means for applying heat to the side portions of the glass stream. However, the cooling gas (air) because of its greater density tends to spread outwardly and cool the glass in the side portions of the stream, and/or interfere with the application of heat to said side portions.

It is known furthermore, and described in U.S. Pat. No. 4,680,051, to provide a forehearth having at least one cooling zone which includes a trough and a refractory roof over the trough, from which roof a pair of spaced projections extend downwardly to define a central channel over the molten glass and side channels over respective side portions of the molten glass. The roof has an area of reduced thickness in the portion over the central channel. An enclosed upper cooling channel extends longitudinally over the area of reduced thickness and has an inlet, and an outlet spaced from the inlet. Heating means are provided for each side portion of the forehearth. This known system removes the cooling air from direct contact with the glass, so that cooling takes place mainly by radiation from the molten glass to the refractory roof, followed by conduction away through the refractory material. Refractories are often poor conductors, however, and so the apparatus is subject to only coarse control and responds very slowly to adjustments.

It is an object of the invention to remove or alleviate at least some of the aforesaid disadvantages. Another object is to provide a forehearth of the type described with more efficient gas or air cooling than known forehearths. A third object is to reduce or even eliminate the need for heat input to a forehearth by reason of the attainment of temperature homogeneity through cooling alone. A further object is to provide a forehearth the operation of which returns substantial savings as compared with current practice and conventional forehearths. A particular object is to equalize the temperature over the cross-section of a relatively fast-flowing stream of molten glass in a forehearth of merely conventional length.

In the development of the present invention it was recognized that centre cooling and side heating was a more efficient method to achieve efficiency and good temperature homogeneity at the forming machine. It was also recognised that cooling air contact with the glass surface in the centre of the channel with the minimum opportunity for the cooling air and combustion products to mix, or for cooling to occur at the sides, might be a more efficient system and might give the required temperature homogeneity at the glass forming stage.

The first step undertaken was to introduce a side firing system which had a large turndown ratio. A proprietary high pressure gas system was selected; this incorporates a fluegas air damper which can be adjusted to keep the forehearth combustion/cooling zone under slightly positive pressure. The cooling air is introduced at the rear of the zone and fed by way of a channel in the centre, the length of the zone, above the roof blocks. As the cooling air passes along this centre channel, it escapes through openings provided in the roof so that the cooling air blows directly onto the centre of the molten glass surface in the chamber below. These openings in the roof structure are slightly wider at the bottom than at the top. On either side of each of these openings, there is a respective other opening to allow the cooling air and combustion products to exit from the chamber. This reduces to a minimum the time available for mixing of the cooling air and combustion products and so prevents the cooling air from cooling the glass near the side wall. Likewise, since the combustion products can exit along the side of the chamber, minimum heating of the centreglass occurs. These side exits communicate with two channels running the length of the zone, above the roof structure, which meet at the front of the zone in a common, air-damped, flue. This allows a controlled equal back pressure to be applied to both channels. The heating and cooling are controlled automatically, with a minimum of applied heating and cooling at all times. When the zone is at well below the set temperature, high firing is employed, with a minimum of applied cooling, or none. As the set temperature is approached, the firing automatically decreases until at the set temperature the cooling and firing are both at a minimum. If the temperature continues to rise, the controls automatically increase the applied cooling, while the firing remains at a minimum. The minimum firing and cooling is set by monitoring a new feeder for a short period of time, at different minimum settings. In fact for high pulls (high rates of glass production) it is often found with this invention that no firing is required.

The difference between the invented method and apparatus and others in use, is the introduction of air directly to the centre of the glass and its removal as quickly as possible, which allows rapid cooling at the centre, while a high temperature is maintained at the sides.

The invention accordingly provides, in a parallel-sided stream of molten glass having a free surface and advancing along and in a tunnel, a method of equalizing the temperature of the glass over the cross-section of the stream by local cooling, which method comprises directing at least one current of cooling air downwardly to strike the mid-line of the stream, and at the same time evacuating air upwardly from two locations one on either side of the current of cooling air, the airflow conditions being adapted to preserve substantial lateral regions of the stream from cooling contact with the current of cooling air.

The invention likewise provides apparatus for performing the above method, which apparatus comprises a forehearth roofed with refractory blocks having cavities which, in the assembled state of the roof, unite to constitute one enclosed central longitudinal feed channel for incoming cooling air, and at least two enclosed lateral longitudinal exhaust channels for spent cooling air, the channels communicating with the airspace or chamber over the molten glass by means of air ducts. Preferably, a refractory block is elongate and parallelepipedal having, in use, an upper face, a lower face and two sides, as well as two ends, and defines three air channel sections extending in parallel from one side to the other. Preferably the refractory blocks if laid side to side produce a layer of blocks with three air channels extending the length of the layer; these channels are preferably terminated by refractory blocks of special design. Another special block connects the central channel to a cooling air input location, and at least one further special block interconnects the two exhaust channels and connects them to an exhaust flue location.

The air ducts are preferably defined by the approximation of matched surface recesses provided in the sides of adjacent refractory blocks. Preferably the recessed blocks in question form a discrete layer underlying those blocks which form the three air channels, the recesses being dimensioned and disposed so as to provide ducts which communicate with the respective channels, to constitute air feed ducts when they communicate with the central channel, and air exhaust ducts when they communicate with either of the two other channels (the exhaust channels). Preferably the matched surface recesses are of tapered configuration, each feed duct expanding from the feed channel towards the molten glass in use, while each exhaust duct expands from the molten glass towards the respective exhaust channel.

Preferably the disposition of the feed ducts is such that in use the cooling air is fed perpendicularly to the free surface of the molten glass in a current which splits "right and left" on striking said surface. Preferably the main axes of the exhaust ducts are inclined so as to facilitate the uptake of air from said split air current.

The invention will be understood in greater detail from the following description of a particular and preferred embodiment thereof, given by way of example only, with reference to the accompanying drawings, in which FIG. 1 is a schematic plan view of a forehearth superstructure with an upper layer of refractory blocks stripped away;

Figure 2:
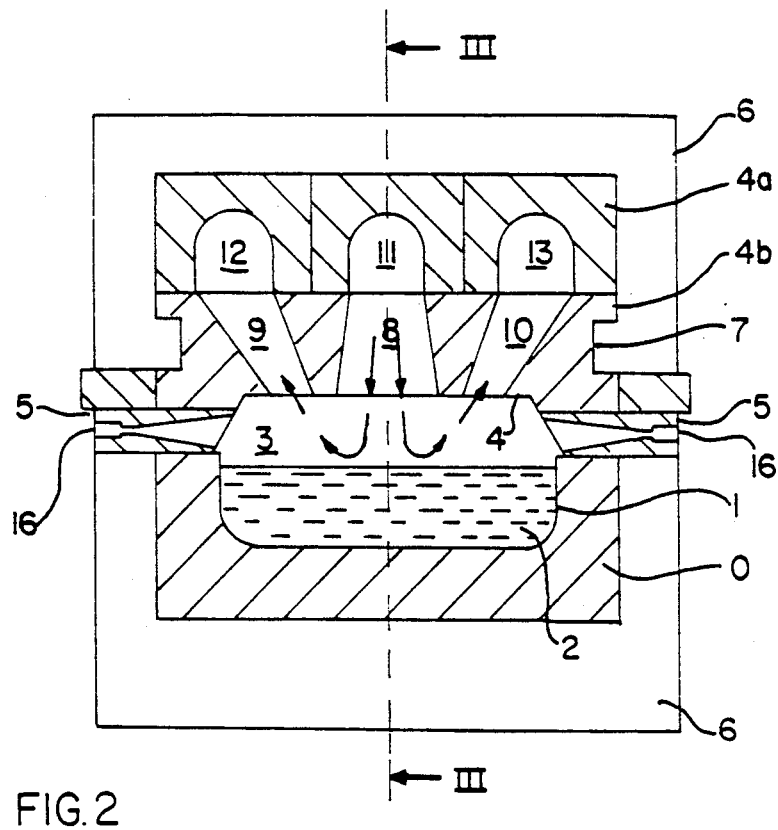
FIG. 2 is a schematic cross-section of a forehearth incorporating the superstructure of FIG. 1, taken along the line II—II in that figure and viewed in the direction of the associated arrows, but with said upper layer of refractory blocks back in place.
Figure 3:
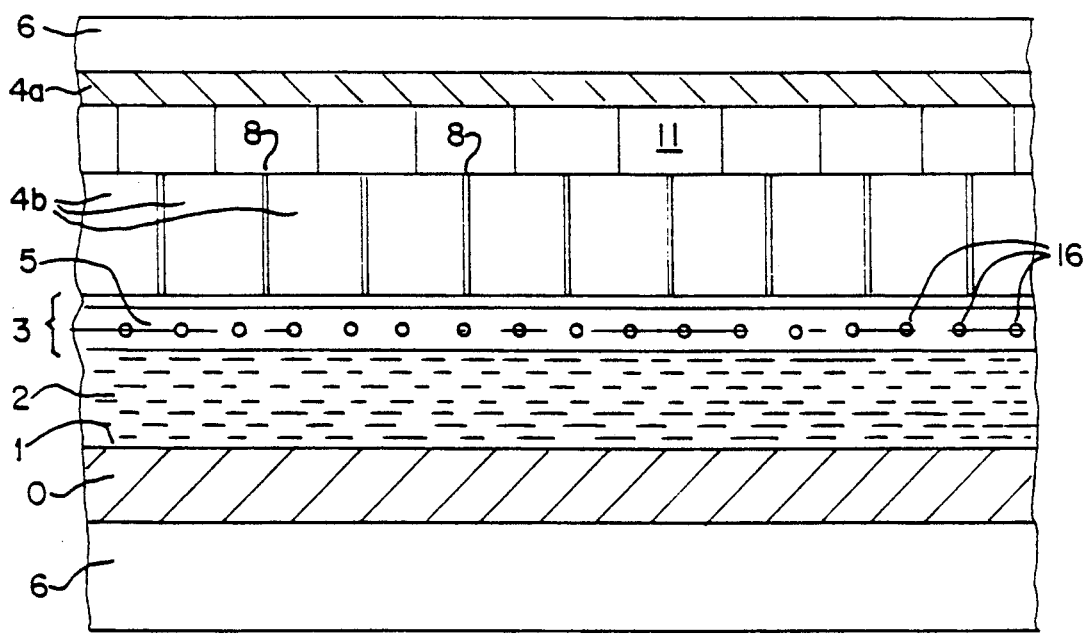
FIG. 3 is a schematic part section, in side elevation, of the forehearth of FIG. 2, taken along the line III—III in that figure and viewed in the direction of the associated arrows.
Figure 4:
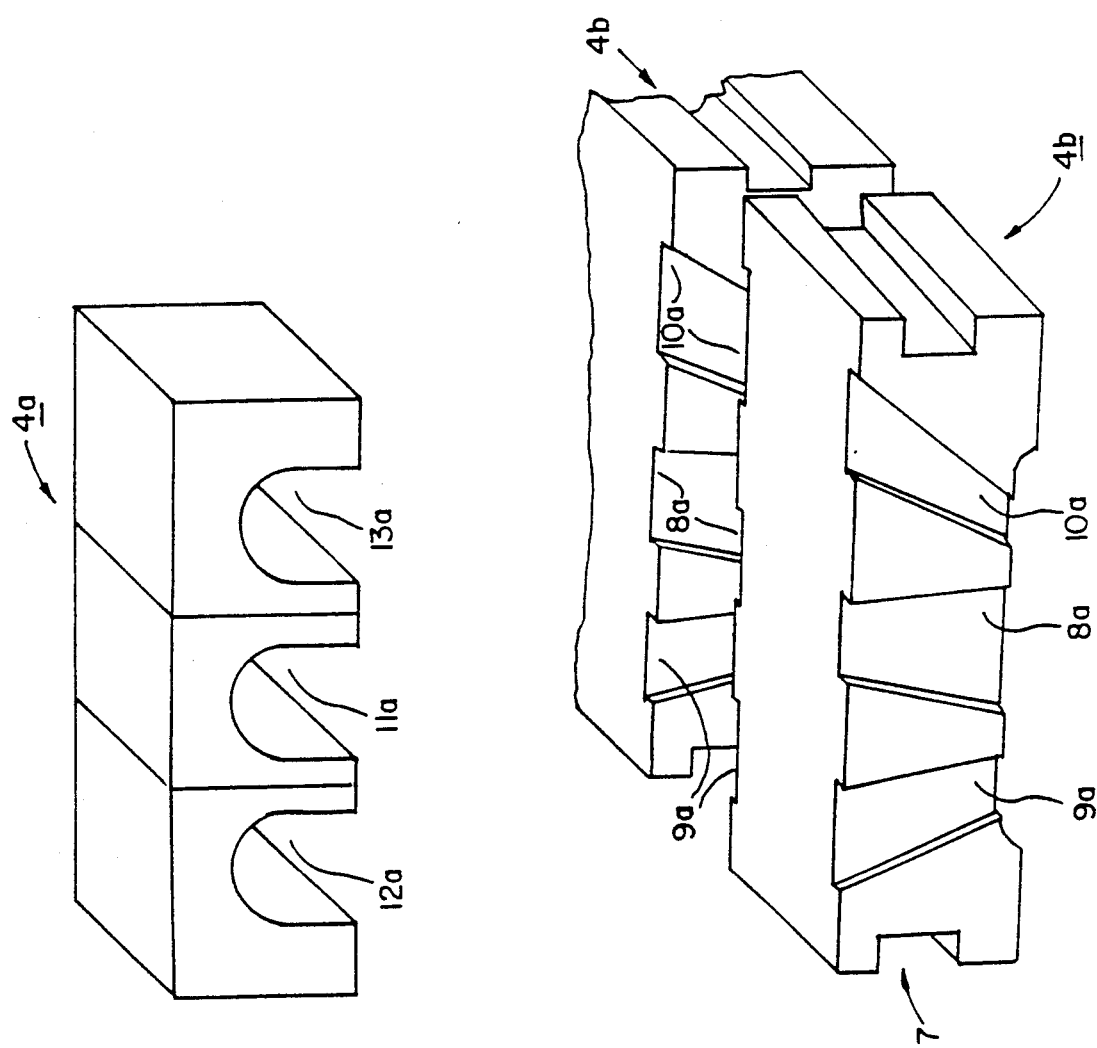
FIG. 4 is a perspective view of three refractory blocks, one (4a) taken from the upper layer and two (4b) from the lower layer of the forehearth of FIGS. 2 and 3; one of the latter is only partly represented.

Referring now to the drawings, a forehearth comprises refractory materials 0 (FIGS. 2 & 3) defining a trough 1 for molten glass 2, and an airspace or chamber 3 thereover, limited by a ceiling 4. The ceiling 4 is formed by a file of refractory blocks 4b laid side by side in mutual contact, each bridging the trough 1, supported on side blocks 5 and keyed into an outer envelope 6 of refractory material by means of an end formation 7 on each end of each block 4b, and a complementary formation on the inside of the outer envelope 6, which formations interengage. The formations 7, however, primarily serve to facilitate handling of the blocks 4b during construction of the forehearth superstructure.

Each of the ceiling blocks 4b is provided on its side faces with respective complementary recesses 8a, 9a 10a which, when the blocks 4b are laid side by side, combine to form, between each pair of blocks 4b, an air feed duct 8 and two air exhaust ducts 9, 10. Thus in use the ceiling presents repeated transversely oriented groups of three air ducts 9, 8, 10, the groups being spaced apart at 20 cm centres longitudinally of the trough 1, where 20 cm is the standard width of the block 4b.

Figure 1:
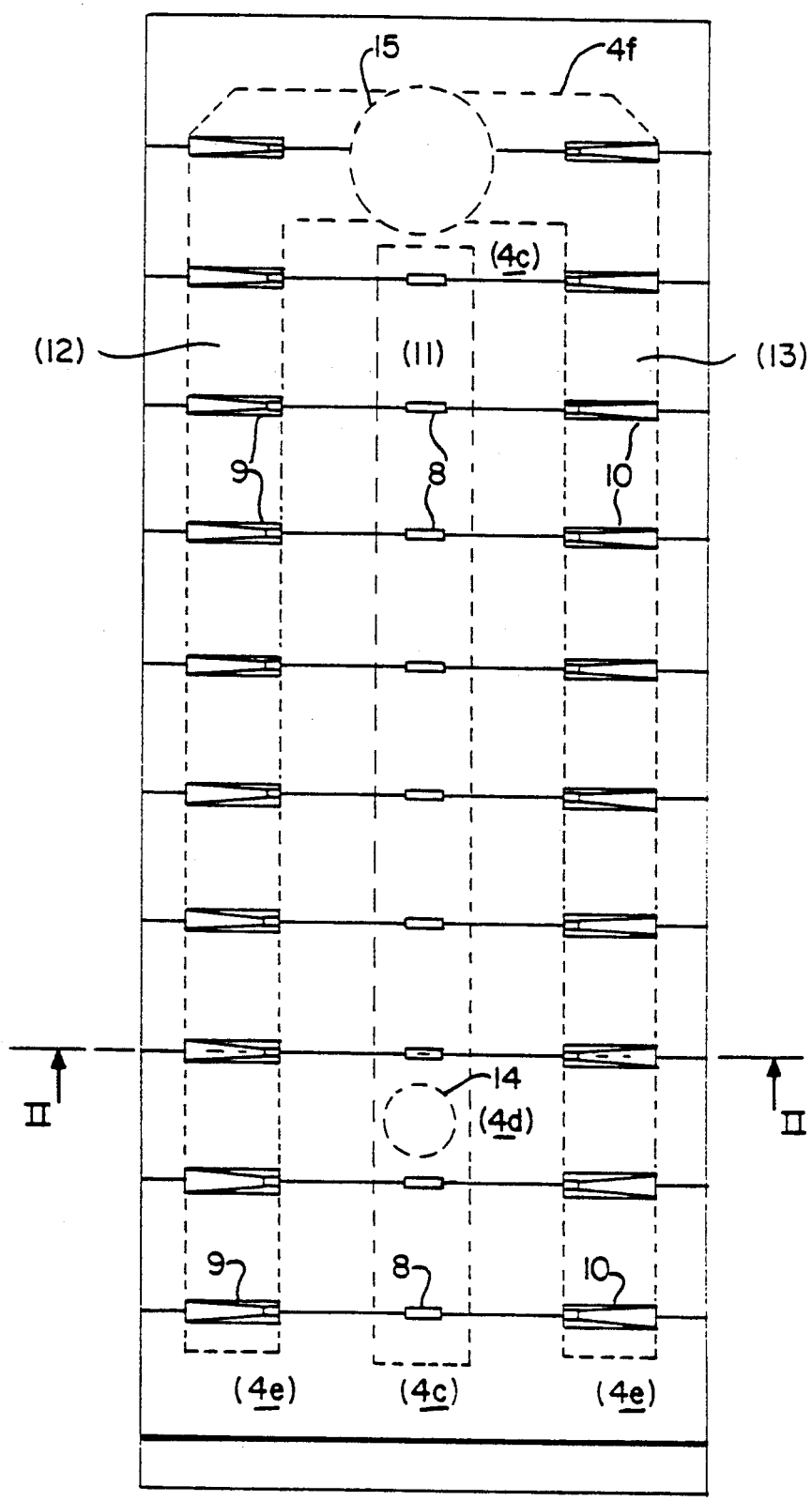

Above the ceiling blocks 4b rests a layer of refractory channel blocks 4a, each presenting three parallel round-topped, downwardly open channels 12a, 11a, 13a, and all enclosed in the outer envelope 6. In use, the blocks 4a lie side to side so as to create three parallel elongate air channels 12, 11, 13, and lie upon the upper faces of the ceiling blocks 4b so as to enclose said channels except at their ends. Special refractory blocks 4c are provided to close the ends of the channel 11 and another refractory block 4d having a top perforation 14 is provided for connecting the channel 11 to a source of cooling air under positive pressure. Special refractory blocks 4e are provided to close one end of each of channels 12 and 13 and a further refractory block aggregate 4f to unite their respective other ends and for connecting said channels 12 and 13 to an exhaust flue 15. The layout of channels 11, 12, 13, blocks 4c, 4d, 4e and 4f, top perforation 14 and flue 15 are indicated in FIG. 1 by means of broken outlines to assist comprehension.

The side blocks 5 house spaced-apart lateral gas burners 16 for heating the glass at the sides of the forehearth.

In use, an air pressure difference is created as between air in the feed channel 11 on the one hand, and the exhaust channels 12, 13 on the other, sufficient to produce a cooling current which proceeds downwardly from the feed ducts 8, strikes the surface of the stream of glass in the middle, fans out and circulates back to be substantially removed through the exhaust ducts 9, 10 as spent or heated air. This circulation is depicted by the six arrows in the central region of FIG. 2. It is substantially confined to the central region of the surface of the stream of molten glass 2 by reason of the geometry of the feed and exhaust ducts 8 and 9, 10 respectively. As a result, the air over the lateral regions of the molten glass stream remains substantially undisturbed, leading in turn to a reduced heat requirement in those regions and, in favourable cases, to the elimination of the need for the use of the gas burners 16. Favourable cases include production runs with high pulls (i.e. high rates of glass production).

I claim:

1. In a parallel-sided stream of molten glass having a free surface and advancing along and in a tunnel, a method of equalizing the temperature of the glass over the cross-section of the stream by local cooling, wherein the improvement comprises directing at least one current of cooling air downwardly to strike the mid-line of the stream, and at the same time evacuating air upwardly from two locations one on either side of the current of cooling air, the airflow conditions being adapted to preserve substantial side regions of the stream surface from cooling contact with the current of cooling air.

2. A method according to claim 1, wherein several currents of cooling air, each disposed in a plane transverse to the direction of flow of the stream of glass, are arranged spaced apart along the midline of said stream.

3. A method according to claim 1, wherein the cooling air is fed perpendicularly to the free surface of the molten glass in a current which splits "right and left" on striking said surface.

4. A method according to claim 3, wherein the air from the locations on either side of the current of cooling air is evacuated in a direction inclined to that of the cooling air incident current, so as to facilitate the uptake of air from said split air current.

5. Apparatus for equalizing, by local cooling, the temperature of molten glass in a parallel-sided stream thereof having a free surface and advancing along and in a tunnel, over the cross-section of the stream, which apparatus comprises a forehearth roofed with refractory blocks containing cavities which, in the assembled state of the roof, unite to define one enclosed central longitudinal feed channel for incoming cooling air, and at least two enclosed lateral longitudinal exhaust channels for spent cooling air, the channels communicating with the airspace or chamber over the molten glass in use by means of air ducts.

6. Apparatus according to claim 5, wherein each refractory block is elongate and parallelepipedal having, in use, an upper face, a lower face and two sides, as well as two ends, and defines three air channel sections extending in parallel from one side to the other.

7. Apparatus according to claim 5 wherein the refractory blocks are laid side to side so as to produce a layer of blocks with three air channels extending the length of the layer, and adapted for connection of a cooling air input to the central channel and for connection of an exhaust flue to the other two channels.

8. Apparatus according to claim 5 wherein the air ducts are defined by surface recesses in the sides of refractory blocks in a discrete layer underlying those refractory blocks which define the channels for incoming and spent cooling air.

9. Apparatus according to claim 8, wherein the air ducts are defined by the approximation of matched surface recesses provided in the sides of adjacent blocks.

10. Apparatus according to claim 9, wherein the matched surface recesses are of tapered configuration, so that each feed duct expands from the feed channel towards the molten glass in use, while each exhaust duct expands from the molten glass towards the respective exhaust channel.

* * * * *